United States Patent
Sechi

(10) Patent No.: US 8,432,638 B2
(45) Date of Patent: Apr. 30, 2013

(54) SHIELDED PERPENDICULAR MAGNETIC RECORDING HEAD

(75) Inventor: Paolo G. Sechi, Woodside, CA (US)

(73) Assignee: SRI International, Menlo Park, CA (US)

( * ) Notice: Subject to any disclaimer, the term of this patent is extended or adjusted under 35 U.S.C. 154(b) by 730 days.

(21) Appl. No.: 12/410,485

(22) Filed: Mar. 25, 2009

(65) Prior Publication Data

US 2010/0246061 A1   Sep. 30, 2010

(51) Int. Cl.
*G11B 5/127* (2006.01)

(52) U.S. Cl.
USPC .................................. 360/125.23; 360/125.3

(58) Field of Classification Search .................. None
See application file for complete search history.

(56) References Cited

U.S. PATENT DOCUMENTS

| | | | |
|---|---|---|---|
| RE33,949 E | 6/1992 | Mallary et al. | |
| 5,122,917 A | 6/1992 | Spainger | |
| 5,995,341 A * | 11/1999 | Tanaka et al. | 360/125.03 |
| 6,809,899 B1 | 10/2004 | Chen et al. | |
| 7,259,553 B2 * | 8/2007 | Arns et al. | 324/207.25 |
| 2004/0212923 A1 | 10/2004 | Taguchi | |
| 2005/0068671 A1 | 3/2005 | Hsu et al. | |
| 2006/0038556 A1 | 2/2006 | Low et al. | |
| 2006/0139815 A1 * | 6/2006 | Nishida et al. | 360/317 |
| 2007/0133129 A1 * | 6/2007 | Matono | 360/317 |
| 2007/0188918 A1 | 8/2007 | Im et al. | |
| 2007/0211384 A1 | 9/2007 | Hsiao et al. | |
| 2007/0253107 A1 * | 11/2007 | Mochizuki et al. | 360/126 |
| 2007/0262771 A1 | 11/2007 | Van Drent et al. | |
| 2008/0112088 A1 | 5/2008 | Hsiao et al. | |
| 2008/0117546 A1 | 5/2008 | Le et al. | |

FOREIGN PATENT DOCUMENTS

EP   1519364 A1   3/2005

OTHER PUBLICATIONS

Grochowski, Ed, HDD Technology Overview Charts, http://www.hitachigst/com/hdd/technolo/overview/chartl3.html, accessed on Jan. 29, 2009, (pp. 19).
Khizroev et al., Perpendicular Magnetic Recording, Feb. 2004, pp. 80-84, 165, Kluwer Academic Publishing, Boston MA, USA.
Western Digital, Perpendicular Magnetic Recording, WD Addresses Hard Drive Capacity Challenge with PMR Technology, Jul. 2008, (pp. 1).
International Search Report for PCT/US2010/028145 dated May 11, 2010; 9 pages.
International Preliminary Report on Patentability for PCT/US2010/028145 dated Sep. 27, 2011, 7 pages.
European Search Report dated Nov. 9, 2012 in counterpart European application No. 10756667.1 (7 pages).

\* cited by examiner

*Primary Examiner* — Holly Rickman
*Assistant Examiner* — Linda Chau
(74) *Attorney, Agent, or Firm* — Guerin & Rodriguez, LLP; Michael A. Rodriguez

(57) ABSTRACT

A magnetic recording head for perpendicular magnetic recording includes energizing means, a recording pole, and a return pole. The recording pole narrows to a tip region with leading and trailing write edges separated by first and second side edges. The tip region provides a low reluctance path for magnetic flux generated by the energizing means. The return pole has a shield flare projecting towards the trailing write edge. A gap separates a leading edge of the shield flare from the trailing write edge. The shield flare diverts magnetic flux from reaching the tip region, thereby shielding the recording medium beneath the shield flare from the magnetic field while the side edges of the tip region and the recording medium beneath the gap are unshielded. A rear flare smoothes the discontinuity at the trailing edge of the return pole, thus reducing the peak magnetic field under the return pole.

19 Claims, 10 Drawing Sheets

SHIELDED PERPENDICULAR MAGNETIC RECORDING HEAD

FIELD OF THE INVENTION

The invention relates generally to magnetic recording heads. More specifically, the invention relates to magnetic recording heads for magnetizing position measurement information in a perpendicular magnetic orientation within a magnetic recording medium formed on a structural member, such as a piston rod.

BACKGROUND

Many industrial and mobile applications use hydraulic or pneumatic cylinders to control the movement and position of machinery. Precise control of a piston's position within a cylinder is often fundamental to controlling the machinery's operation. Accordingly, industry has produced various mechanical, magnetic, acoustic, and optical techniques for detecting the instantaneous position of a moving piston with respect to the cylinder.

One technique is to encode position information magnetically in the material of the piston rod. Typically, the substrate of the piston rod is made of a ferromagnetic material, such as steel, and can be magnetized. However, such material is magnetically "soft." In general, magnetically soft material has low coercivity, the measure of difficulty for magnetically encoding and erasing information in that material. Thus, position information encoded in material with low coercivity is subject to accidental erasure or alteration.

To improve information retention, various position detection systems plate the magnetically soft piston rod with a magnetically hard recording medium with high coercivity, and record the position information in this recording medium. In addition, the magnetically hard recording medium can have chrome plating for protection from the harsh operating conditions within which the piston operates, internal conditions, such as the pressurized fluid that drives the motion of the piston, and external conditions, such as dust and debris.

Most magnetic recording is longitudinal in orientation. With longitudinal recording, magnetization lies in the plane of the recording medium. The magnetic pattern of longitudinal recording media consists of transitions or reversals of the in-plane magnetization from one polarity to the other. The magnetic poles, whose stray flux is sensed by a read head located above the recording medium, mark the reversals. Longitudinal recording, however, does not perform well in the presence of a ferromagnetic (i.e., magnetically soft) substrate. Being magnetically permeable, a ferromagnetic substrate provides a low reluctance path for the magnetic flux. This low reluctance path can make longitudinal recording difficult to achieve because it is challenging to maintain a uniform magnetic field parallel to the substrate surface. Additionally, the magnetically permeable substrate can cause the longitudinal encoding to exhibit a reduced level of magnetic flux available for sensing, thus posing a problem for information retention and readback.

SUMMARY

In one aspect, the invention features a magnetic recording head for perpendicular magnetic recording of information into a recording medium. The magnetic recording head comprises means for energizing the magnetic recording head to produce a magnetic field. A recording pole narrows to a tip region having a leading write edge and a trailing write edge separated by first and second opposed side edges. The tip region provides a low reluctance path for magnetic flux generated by the energizing means. A return pole is spatially separated from and opposite the recording pole. The return pole has a base and a shield flare projecting forward from the base towards the trailing write edge of the tip region of the recording pole. A leading edge of the shield flare is separated from the trailing write edge of the tip region by a gap. The shield flare diverts magnetic flux generated by the energizing means from reaching the tip region of the recording pole, thereby shielding a recording medium beneath the shield flare from the magnetic field while the opposed side edges of the tip region of the recording pole and the recording medium beneath the gap are unshielded.

In another aspect, the invention features a system for magnetically recording information, comprising a structural member having a magnetic recording medium at a surface thereof, and a magnetic recording head movably disposed on the surface of the structural member for magnetically recording information in the recording medium in a perpendicular magnetic orientation. The magnetic recording head comprises means for energizing the magnetic recording head to produce a magnetic field, a recording pole, and a return pole spatially separated from and opposite the recording pole. The recording pole narrows to a tip region having a leading write edge and a trailing write edge separated by first and second opposed side edges. The tip region provides a low reluctance path for magnetic flux generated by the energizing means. The return pole has a base and a shield flare projecting forward from the base towards the trailing write edge of the tip region of the recording pole. A leading edge of the shield flare is separated from the trailing write edge of the tip region by a gap. The shield flare diverts magnetic flux generated by the energizing means from reaching the tip region of the recording pole, thereby shielding a recording medium beneath the shield flare from the magnetic field while the opposed side edges of the tip region of the recording pole and the recording medium beneath the gap are unshielded.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Perpendicular magnetic recording may be a more preferred orientation of magnetization for recording mediums on magnetically soft substrates than longitudinal recording. In perpendicular media, the magnetization is perpendicular to the plane of the recording medium. Read sensors located above the recording medium detect the stray flux of the magnetized poles and transitions (i.e., reversals in polarity) between regions magnetized "up" and "down." The permeability of a ferromagnetic substrate is beneficial for such perpendicular recording. The return path in a ferromagnetic substrate between adjacent oppositely magnetized regions does not affect the stray flux in the region above the recording medium, and assists in the write process and in the retention of the written information.

Magnetic recording (or write) heads constructed in accordance with the invention are useful for encoding position measurement information in a magnetic recording medium on a magnetically soft material, such as steel, in a perpendicular magnetic orientation. Such recording heads include a main pole (herein, also called a recording pole) and a return pole. The recording pole concentrates the magnetic field in a tip region situated closely above or abutting the recording medium.

The return pole has a shield pole (herein, also called a shield flare) that extends towards the recording pole; a sub-millimeter gap separates the poles. The shield flare shields the recording medium from the magnetic field emanating from the recording pole. The effectiveness of the shield flare to shunt the magnetic field and its proximity to the recording pole enable sub-millimeter encoding.

The return pole can also have a rear flare that extends rearward from the base of the return pole. The rear flare increases the area of the return pole, and serves to keep the magnetic field strength within the recording medium beneath the return pole to a value well below the coercivity of the recording medium. Accordingly, the magnetic field produced during the magnetizing of one region does not cause erasure of a neighboring, previously recorded region, as described below.

Figure 1:
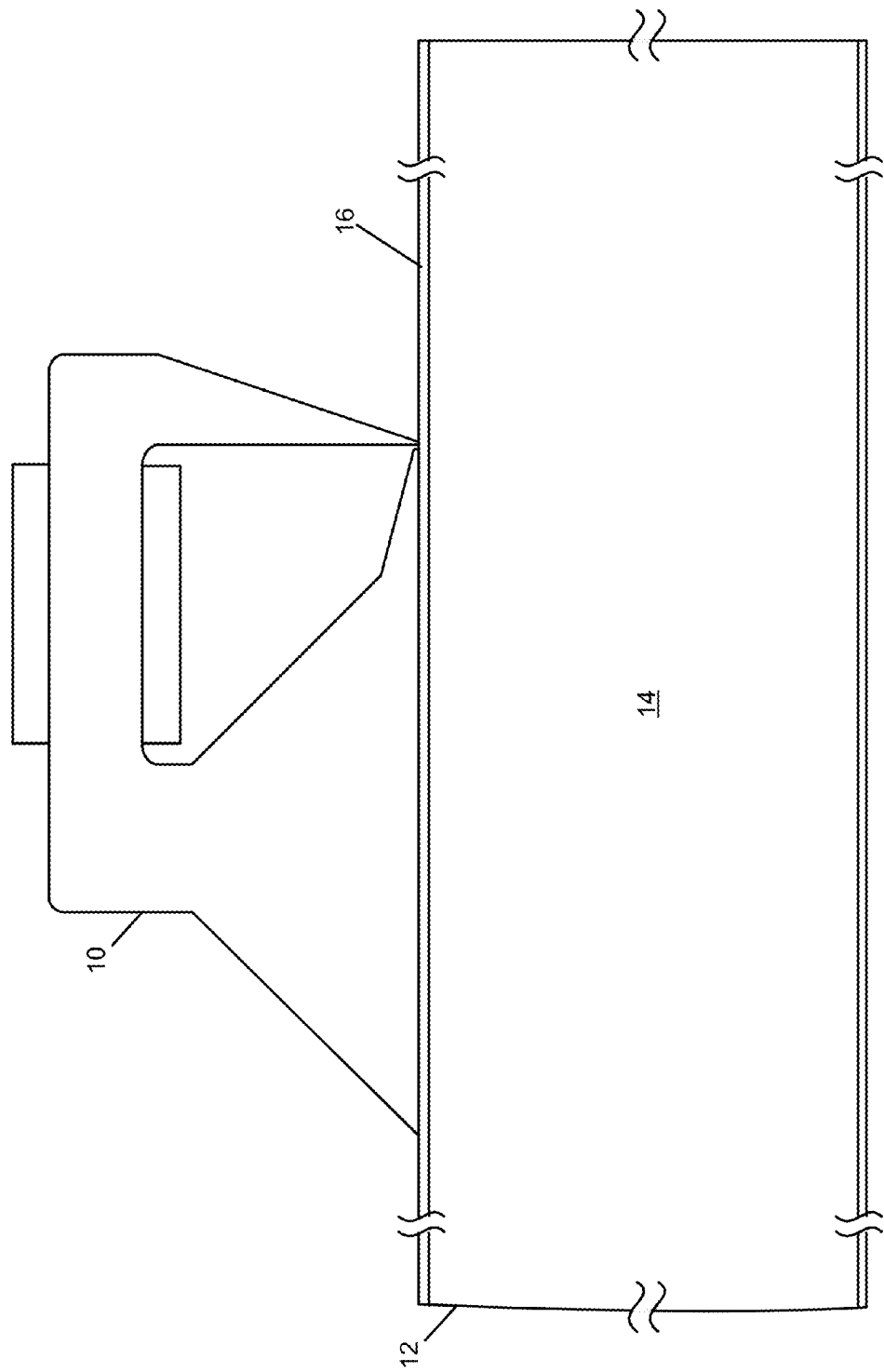
FIG. 1 is a cross-section view of an embodiment of a recording head disposed on a structural member, such as a piston rod, with a magnetic recording medium formed at a surface thereof.

FIG. 1 shows a cross-sectional side view of an embodiment of a magnetic recording head 10 constructed in accordance with the invention. The base of the magnetic recording head 10 sits on the surface of a structural member 12. The structural member 12 includes a substrate 14 with a magnetic recording medium 16 at a surface thereof. The magnetic recording head 10 is particularly suited for ferromagnetic substrates. Notwithstanding, the substrate 14 of the structural member 12 can comprise non-magnetic material (e.g., plastic, aluminum, ceramic, or glass) without departing from the principles of the invention.

The magnetic recording head 10 is used to magnetize regions of the magnetic recording medium 16. When recording, an energized magnetic recording head 10 moves towards the right (with respect to FIG. 1) while the structural member 12 with the magnetic recording medium 16 remains fixed, or the structural member 12 moves left while the magnetic recording head 10 remains fixed. Each magnetized region is an area of perpendicularly oriented magnetic dipoles. Such magnetized regions may be referred to herein, individually or collectively, as magnetic bits, dots, marks, patterns, or encoding. The recording produces a track of magnetized regions that runs lengthwise (left-to-right in FIG. 1) along the structural member 12.

In one embodiment, the structural member 12 is a piston rod (also called a cylinder rod). The piston rod is secured at one end to a piston that moves in-and-out along an axis within the barrel of a hydraulic cylinder. The piston rod, which extends beyond one end of the cylinder barrel, is coupled directly or indirectly to a machine component. The movement of the piston rod thus drives the movement of the machine component.

The magnetized regions of the recording medium can be used to determine the position of the piston rod with respect to its housing. Read sensors in the hydraulic cylinder read the position measurement information encoded in the recording medium as the piston rod moves relative to the cylinder. Examples of methods for determining piston rod position from magnetized regions are described in U.S. Pat. No. 6,989,669 issued to Low et al. on Jan. 24, 2006, U.S. Pat. No. 7,034,527 issued to Low et al. on Apr. 25, 2006, and U.S. Pat. No. 7,259,553 issued to Arns et al. on Aug. 21, 2007, the entireties of which U.S. patents are incorporated by reference herein. The magnetic recording of this position measurement information into the recording medium 16 can occur before or after installation of the hydraulic cylinder, with the piston and piston rod, into the particular machinery.

Figure 2:
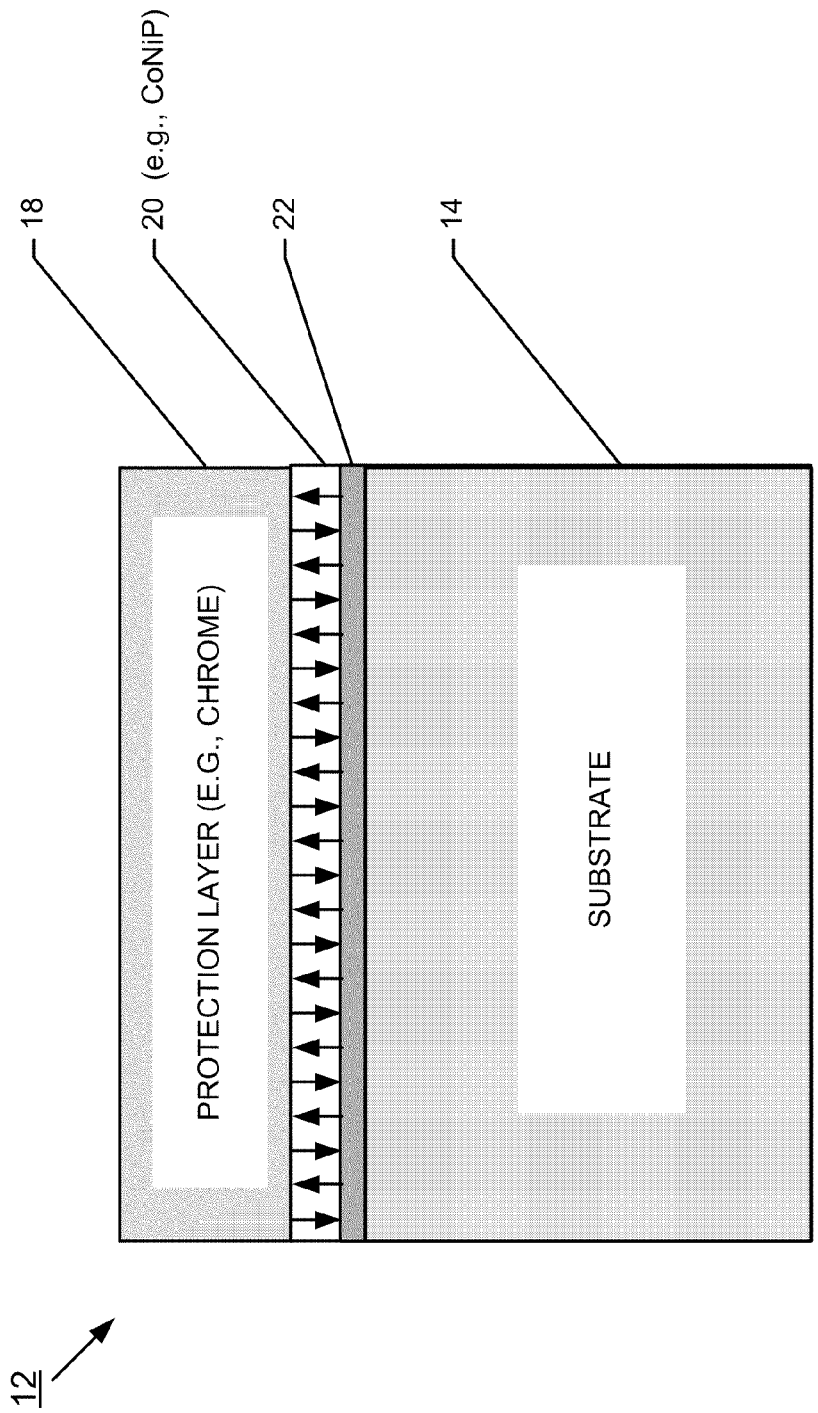
FIG. 2 is a cross-section view of one embodiment of the magnetic recording medium.

FIG. 2 shows one embodiment of the magnetic recording medium 16 of FIG. 1. The magnetic recording medium 16 includes a protection layer 18, a magnetically hard recording layer 20 comprised of a high coercivity magnetic material, and an optional under layer 22.

The protection layer 18 provides sufficient resistance to mechanical wear and corrosion associated with the types of harsh environments in which the structural member 12 (e.g., a piston rod) may operate. One embodiment of the protection layer 18 can be hard chrome, i.e., a Cr layer. Notably, a chrome protective layer exhibits strong adhesion to a magnetically hard recording layer comprised of CoNiP, exhibiting similar adhesion strength as chrome to steel.

The thickness of the protection layer 18 is a factor affecting how close a read sensor can get to the magnetically hard recording layer 20, and is designed to minimize such distance. In one embodiment, the chrome plating is 50 µm. In embodiments without a protection layer, the magnetically recorded regions can be located more closely together because the read sensors can be placed nearer to the encoded magnetically hard recording layer 20 than when the protection layer 18 is present.

The magnetically hard recording layer 20 is a magnetic film of high coercivity that provides the medium within which to record information magnetically. Magnetic layers or films of high coercivity can maintain recorded information under external stray fields and under the demagnetization fields deriving from the imposed magnetic transitions. This layer 20 can be continuous or discontinuous on the structural member 12 and cover all or a portion of it. For example, the magnetically hard layer 20 may not be present at the ends of a piston rod. In one embodiment, the magnetically hard recording layer 20 is made of CoNiP (Cobalt Nickel Phosphorous) and has a thickness in the range of 5 μm to 20 μm. In this embodiment, the CoNiP layer has a coercivity that is approximately equal to 188 kA/m. In general, the signal strength that is detectable by a read sensor is directly proportional to the thickness of the magnetically hard recording layer. For example, a twofold increase in its thickness produces a twofold increase in signal strength.

The optional under layer 22 is disposed between the magnetically hard recording layer 20 and the substrate 14. In one embodiment, the under layer 22 is made of a non-magnetic amorphous material, such as Ni—P. In general, an under layer made of non-magnetic amorphous material can reduce signal strength at the outer surface of the piston rod 12, and so its thickness should be minimized (less than 5 μm). Alternatively, the under layer 22 can be made of a magnetically soft material (e.g., permalloy or Ni—Fe) that can beneficially mask unreliable or non-uniform permeability of a ferromagnetic substrate or improve information retention on a non-magnetic substrate. In this case, the thickness of under layer 22 would not need to be minimized.

Figure 3:
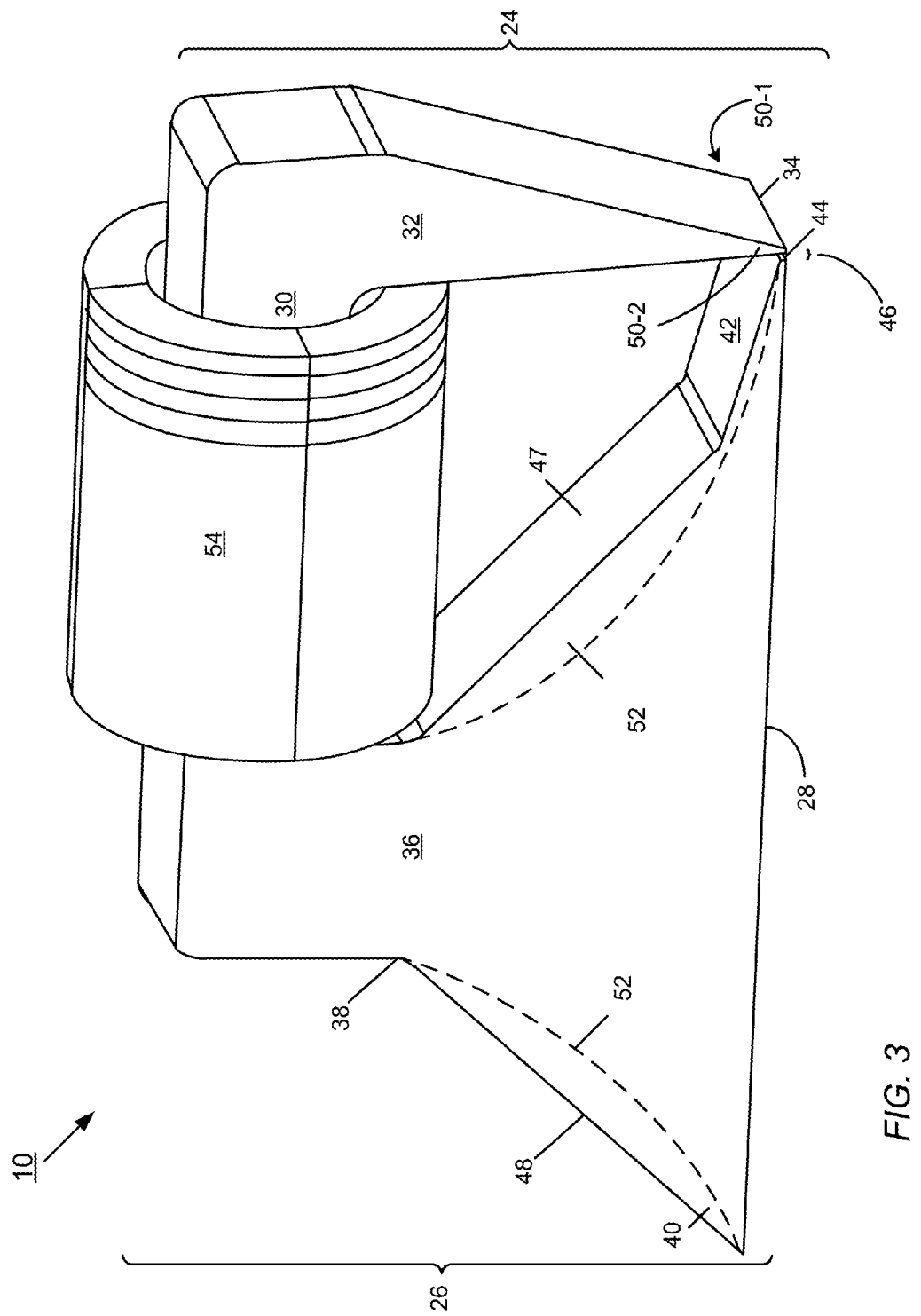
FIG. 3 is a three-dimensional side view of the magnetic recording head of FIG. 1, with an alternative embodiment shown in dashed lines.

FIG. 3 shows a three-dimensional side view of the magnetic recording head 10 of FIG. 1. The magnetic recording head 10 includes a front end 24, a back end 26, a base 28, a midsection 30, a recording pole 32 at the front end 24, and a return pole 36 at the back end 26. The magnetic recording head 10 can be made of a unitary piece of ferromagnetic material, or the recording and return poles 32, 36 can be separable end joints that physically couple to the midsection 30. In one embodiment, the magnetic recording head 10 is 42 mm long, 20 mm tall, and 5 mm wide, and its composition made of low-carbon steel material, for example, AISI (American Iron and Steel Institute) 1010.

At the front end 24, the recording pole 32 bends orthogonally from the midsection 30 towards the base 28. The generally triangular side profile of the recording pole 32 narrows to a tip 34. The tip 34 of the recording pole 32 has a leading write edge 60 (FIG. 5) and a trailing write edge 62 (FIG. 5) separated by side edges 50-1, 50-2 (generally, 50). In one embodiment, the tip 34 is approximately 5 mm wide from side edge 50-1 to side edge 50-2 and approximately 0.2 mm long from leading write edge 60 to trailing write edge 62.

At the back end 26, the return pole 36 bends orthogonally from the midsection 30 towards the base 28 and opposite the recording pole 32. The return pole 36 has a neck region 38 that widens to form a rear flare 40 and a shield flare 42. The widening portion of the return pole 36 has a sloped leading edge 47 and a sloped trailing edge 48. The slope angle of the trailing edge 48, from the neck region 38 to the tip of the rear flare 40, is approximately 45 degrees with respect to the base 28. The slope angle of the leading edge 47 starts from the neck region 38 at approximately 45 degrees and, at about 2 mm above the base 28, decreases to a slope angle of less than 30 degrees (with respect to the base 28).

The rear flare 40 has a triangular side profile that projects rearward of the neck region 38. The rear flare 40 operates to control the magnetic field strength between the return pole 36 and the substrate 14 of the structural member 12, as described below. In the embodiment shown, approximately 12 mm of the base 28 is attributed to the rear flare 40 (i.e., as measured from an imaginary vertical line extending the vertical edge of the neck region 38 down to the base 28).

Other embodiments of magnetic recording heads can have longer or shorter rear flares than that shown. The particular length of the rear flare used in a given magnetic recording head embodiment is governed by practicality: whereas longer lengths can produce lower magnetic field strengths beneath the return pole (because of increased return pole area), less of the length of the structural member is available for recording (because the rear flare should not extend beyond the length of the structural member during recording). Conversely, shorter rear flares increase the length of the structural member that is available for recording, but also can lead to an increase in the magnetic field strength under the return pole, and a corresponding increase in the chance for undesirable partial erasure.

The shield flare 42 has a shape like an inclined plane that narrows to a leading edge 44. The width of the leading edge 44 is equal to the width of the tip 34 of the recording pole 32. A gap 46 separates the leading edge 44 of the shield flare 42 from the trailing write edge 62 of the tip 34 of the recording pole 32. In one embodiment, the gap 46 is approximately 0.2 mm. As described below, the shield flare 42 operates to shape the magnetic field in the recording region of the tip 34 of the recording pole 32. More specifically, the shield flare 42 shields the recording medium 16 from much of the magnetic field on the trailing side of the recording pole 32.

Notably, the leading edge 60 and side edges 50 of the recording pole 32 are unshielded. Shielding on these edges of the recording pole are unnecessary because of the type of applications for which the recording head is adapted (e.g., encoding position information on piston rods). No shielding is needed on the leading side of the recording pole because any magnetization of the recording medium in the forward direction is overwritten when the recording head moves forward to record the next region. With respect to the side edges of the recording pole, no shielding is needed because magnetization of the recording medium beyond the width of a recorded track does not interfere with or detract from the resolution of position information recorded lengthwise along the structural member 12. Moreover, a wide track is often desirable and beneficial because it reduces the alignment accuracy required to read the encoded track.

Figure 4:
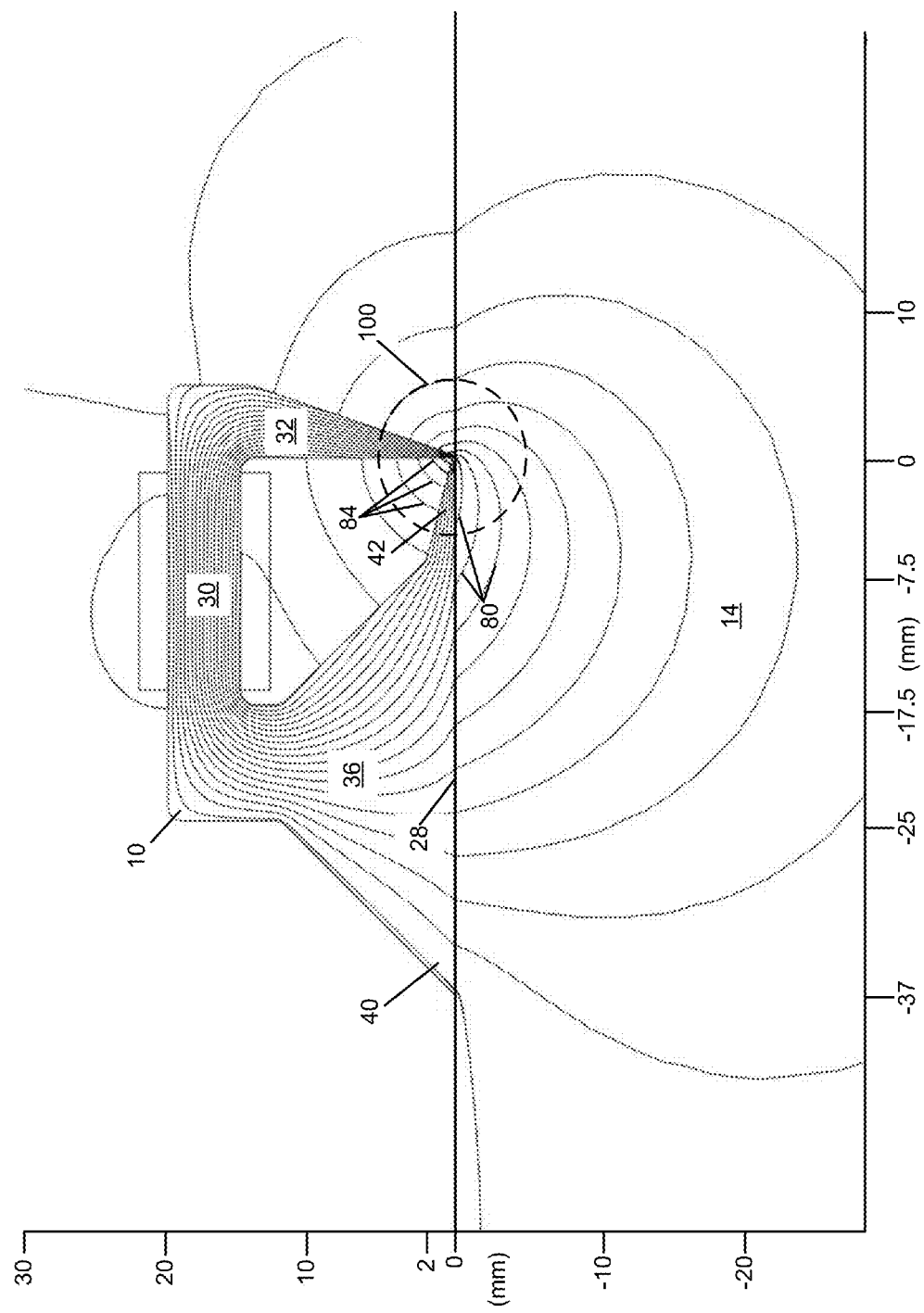
FIG. 4 is a side view of the energized magnetic recording head of FIG. 1 and a contour view of flux lines produced by the magnetic recording head when energized.

The rear and shield flares 40, 42 can have shapes other than the inclined-plane shapes shown in FIG. 4. For example, the leading and trailing edges of the return pole 36 that fan out to provide the rear flare and shield flare can be arcuate, such as illustrated by dashed lines 52. Such shapes can produce rear and shield flares that perform adequately their respective roles of achieving a low magnetic field beneath the return pole and of shielding the recording medium from the high magnetic field at the recording pole.

A coil of wire 54 wraps around the midsection 30 of the recording head 10. The number of turns of the coil 54 and the amount of current passed through the turns are designed to generate a given magnetic flux. In one embodiment, the coil 54 includes 200 turns of 30-gauge wire. An electrical current of up to 2.5 A flowing through such a coil energizes the magnetic recording head and generates a magnetic field strength of greater than 1.2 MA/m over a 0.2 mm×5 mm area (i.e., an area corresponding to the tip of the recording pole). This magnetic field strength is sufficient to saturate the CoNiP layer and induces the magnetic domains in the magnetically hard layer 20 to align themselves perpendicularly as the recording head moves relative to the substrate 14. In general, the amount of current required to produce the desired magnetic field strength depends on the geometry of the substrate (e.g., flat, curved, etc.). Although shown to be wrapped around the midsection 30, other embodiments of magnetic recording heads can have the coil wrapped around the recording pole or the return pole (or both).

FIG. 4 is a side view showing the magnetic flux density for the energized magnetic recording head 10. Values on the x-axis represent distances from the trailing write edge 62 of the recording pole 32, with the location directly below the trailing write edge having a value of zero, distances forward of the trailing write edge having positive values, and distances rearward of the trailing write edge having negative values. Values on the y-axis represent distances from the surface of the structural member 12, with the surface having a value of zero. Distances above the surface have positive values, and distances below the surface have negative values.

As shown, the base 28 of the return pole 36, which includes the shield flare 42 and the rear flare 40, completes a magnetic circuit through the magnetically soft substrate 14 of the structural member 12. Flux lines 80 travel a magnetic circuit, passing from the midsection 30, through the recording pole 32 into the substrate 14 (through the recording medium), into the return pole 36, and back to the midsection 30. Some flux lines 84 pass directly from the recording pole 32 to the shield flare 42 without entering the structural member 12.

Use of the rear flare 40 effectively increases the area of the return pole 36, which operates to reduce the magnetic field strength under the return pole 36. Thus, for the same overall physical dimension, the magnetic recording head 10 can generate higher magnetic field strengths under the recording pole 32 without increasing the magnetic field strength under the return pole 36 and, thereby, threatening to erase a previously recorded neighboring region. In addition, the taper of the rear flare 40 serves to smooth the transition between the structural member 12 and return pole 36, thus keeping the magnetic field from becoming too large at the far end pole-head discontinuity and posing a threat to a previous recording.

Use of a protruding shield flare 42 to form part of the magnetic circuit, instead of relying entirely on the bulk of the return pole 36, allows the reluctance of the magnetic circuit formed by the shield flare 42 to be tailored independently of the design of the recording pole 32. Thus, the recording pole 32 can be designed for maximum performance, allowing the recording head to maintain high efficiency, diverting only enough magnetic flux as is necessary to achieve the desired shielding performance, while leaving the majority of the flux available for recording the bit.

Figure 5:
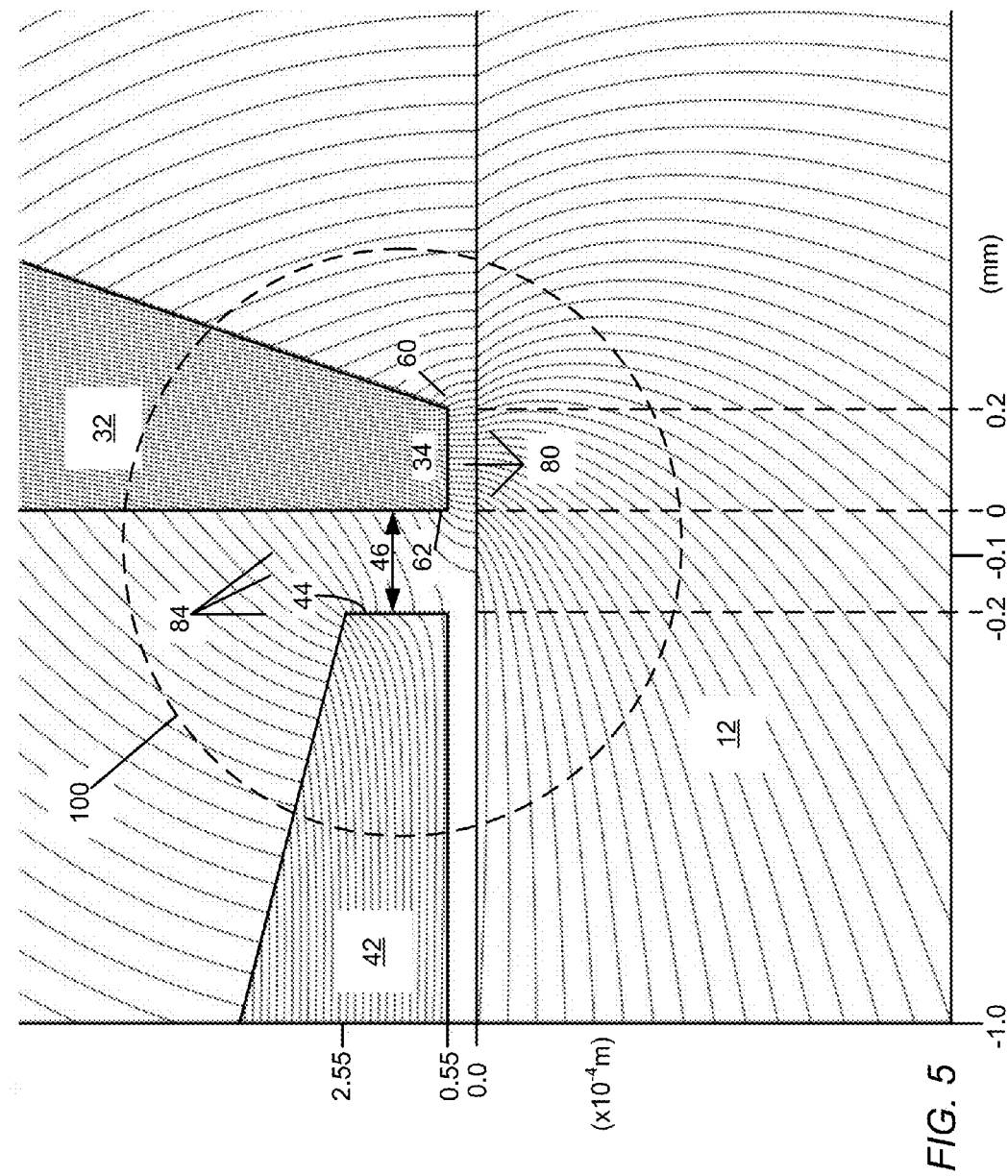
FIG. 5 is a zoomed-in side view of the energized magnetic recording head and contour of flux lines at the recording region shown in FIG. 4.

FIG. 5 shows a zoomed-in view of the recording region 100 shown in FIG. 4. On the x-axis are distances relative to the trailing write edge 62 of the recording pole 32. The y-axis represents distances from the surface of the structural member 12. The tip of the recording pole 32 and the shield flare 42 sit on the chrome plating, approximately 55 um from the surface of the structural member 12.

The gap 46 separating the leading edge 44 of the shield flare 42 from the trailing write edge 62 of the recording pole 32 exposes the recording medium 16 to the magnetic flux emanating the recording pole 32. The size of the gap imposes a constraint on the minimum size of the recorded bit that affects the number of distinct bits that can be recorded lengthwise along a track. (Another constraint on the minimum size of the recorded bit is the length of the recording tip 34). Other embodiments of the magnetic recording head can have a different gap size from the 0.2 mm gap shown in FIG. 5, for example, in the range of 0.1 mm to 2 mm. Manufacturing capability may limit how small a gap can be precisely machined or assembled for a macroscopic object, such as the recording head, which is tens of mm in size. The upper end of the range depends upon the desired bit resolution.

In FIG. 5, the contour lines 80, 84 represent the magnetic flux produced by energizing the recording head 10. The density of flux lines 80 is greatest directly beneath the tip 34 of the recording pole 32. In addition, the shield flare 42 draws off flux 84 directly from the recording pole 32. The triangular shape of the shield flare 42 achieves a balance between drawing off too much flux, and thereby overly reducing the recording efficiency of the recording pole, as generally occurs with a return pole having a vertical leading edge, and too little flux, and thereby permitting erasure of neighboring previously recorded bits.

Figure 6:
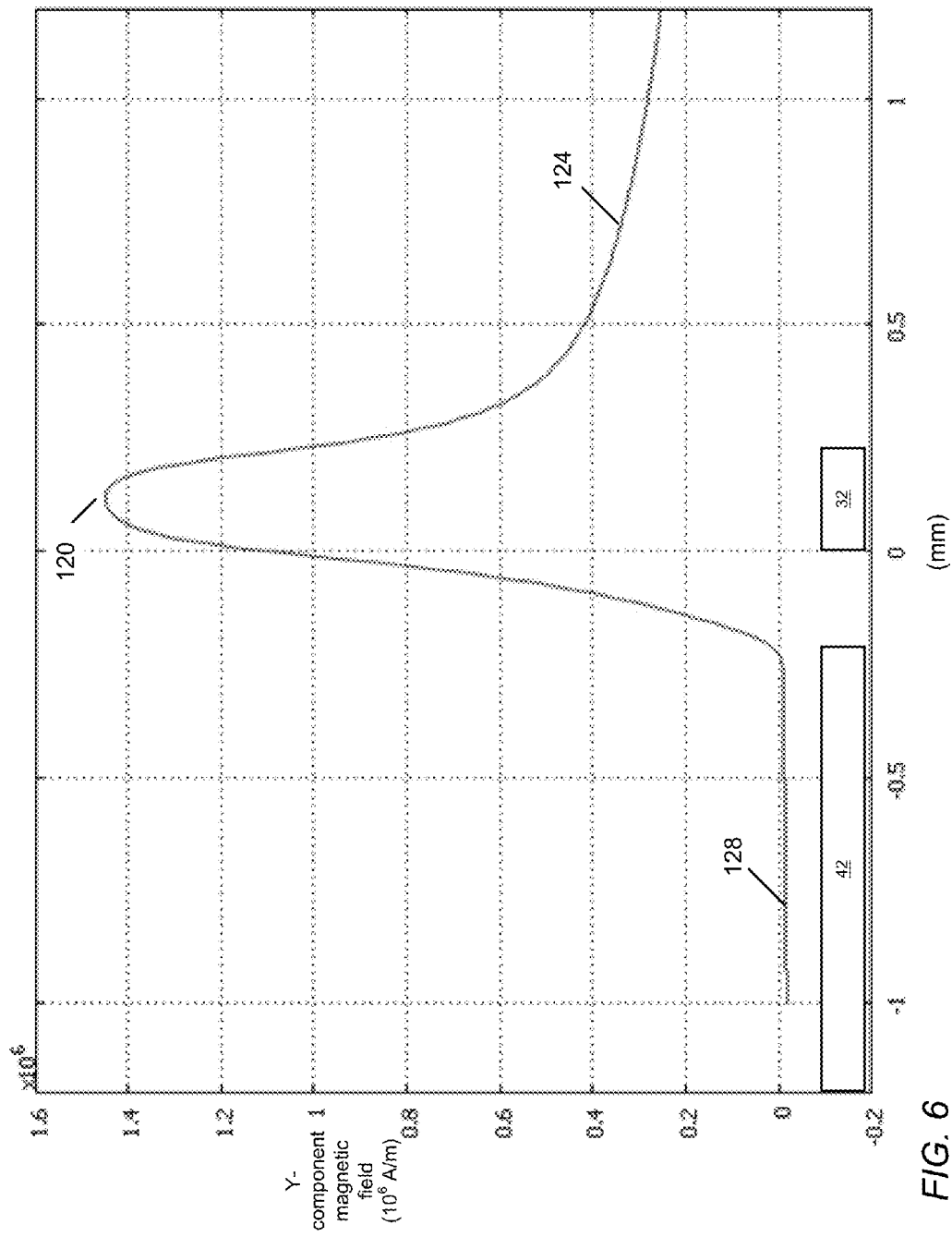
FIG. 6 is a plot of the magnetic field (perpendicular component) in the recording medium as a function of distance from the recording pole of the energized magnetic recording head.

FIG. 6 shows a plot of the perpendicular component of the magnetic field in the center of the recording medium, 2.5 µm above the surface of structural member 12 shown in FIG. 5. The x-axis represents distances from the trailing write edge 62 of the recording pole 32. The location directly below the trailing write edge has a value of zero. Distances forward of the trailing write edge having positive values, and distances rearward of the trailing edge having negative values. The y-axis represents the perpendicular component of the magnetic field at the center of the recording medium.

The peak 120 of the magnetic field occurs directly beneath the 0.2 mm long tip 34 of the recording pole 32. Beneath the tip, the magnetic field strength is greater than 1.2 MA/m, which exceeds the saturation magnetization of the magnetic recording medium (1.2 MA/m for this CoNiP formulation).

Because of the presence of the shield flare 42, the magnetic field 128 falls to zero at approximately 0.2 mm from the shielded, trailing side of the recording pole 32. On the forward side of the recording pole 32, where no shield is present, the magnetic field 124 decreases more slowly than on the shielded, trailing side. Even at 1 mm forward of the recording pole (i.e., to the right) the magnetic field is well above zero (greater than 200 kA/m). Without the shield flare 42 on the trailing side (i.e., on the left) of the recording pole, the magnetic field strength at 1 mm distant from the trailing edge of the recording pole would mirror that on the forward side, and would thus be greater than the coercivity of the magnetic recording medium (188 kA/m for this CoNiP medium). The result would be the erasure of the previously recorded region, which had been recorded with the opposite polarity of the region currently being recorded. Thus, by causing the magnetic field to decrease precipitously to a low level from peak value, the shield flare 42 prevents undesirable erasure of neighboring regions and permits sub-millimeter encoding.

Figure 7:
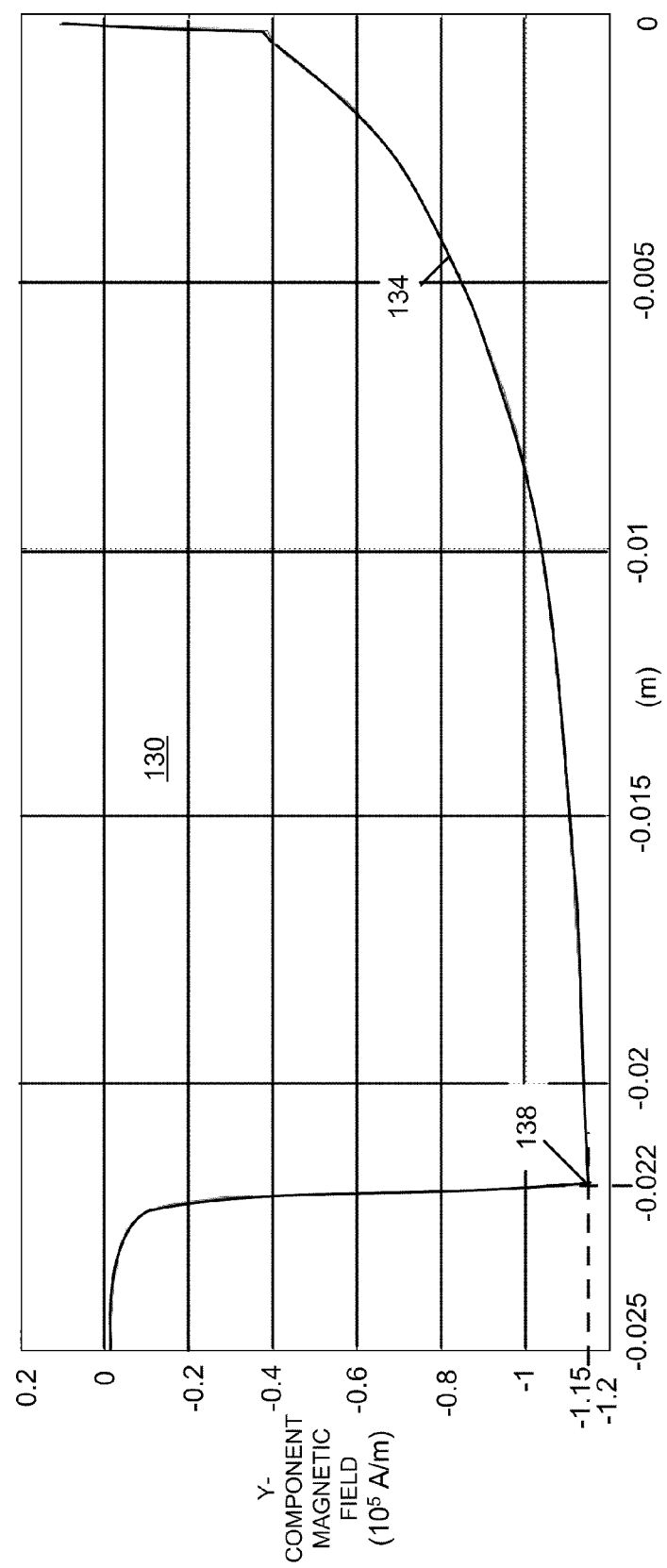
FIG. 7 is a plot of the magnetic field (perpendicular component) beneath a return pole that lacks a rear flare such as that shown in FIG. 3.

FIG. 7 shows a graph 130 of magnetic field strength (perpendicular component) beneath the return pole 36 for an embodiment of a magnetic recording head that lacks a rear flare. In such an embodiment, the trailing edge 48 of the return pole is a vertical edge (here, for example, approximately 22 mm from the trailing write edge of the recording pole). Values on the x-axis represent distances from the trailing write edge of the recording pole 32. The location directly beneath the trailing write edge of the recording pole has a value of zero. Distances rearward of the trailing write edge have negative values. Values on the y-axis represent the y- or perpendicular component of the magnetic field in A/m.

As this embodiment illustrates, without a rear flare the magnitude of the magnetic field gradually increases (134) along the length of the return pole to reach a peak value at the vertical edge where the return pole ends. This point (138) is approximately 22 mm from the trailing write edge of the recording pole. At this point, the maximum magnetic field strength is approximately 115 kA/m. Because the coercivity of the magnetic recording medium is approximately 188 kA/m, the 115 kA/m magnetic field strength at the vertical edge of the return pole can cause partial erasure of previously recorded information.

Figure 8:
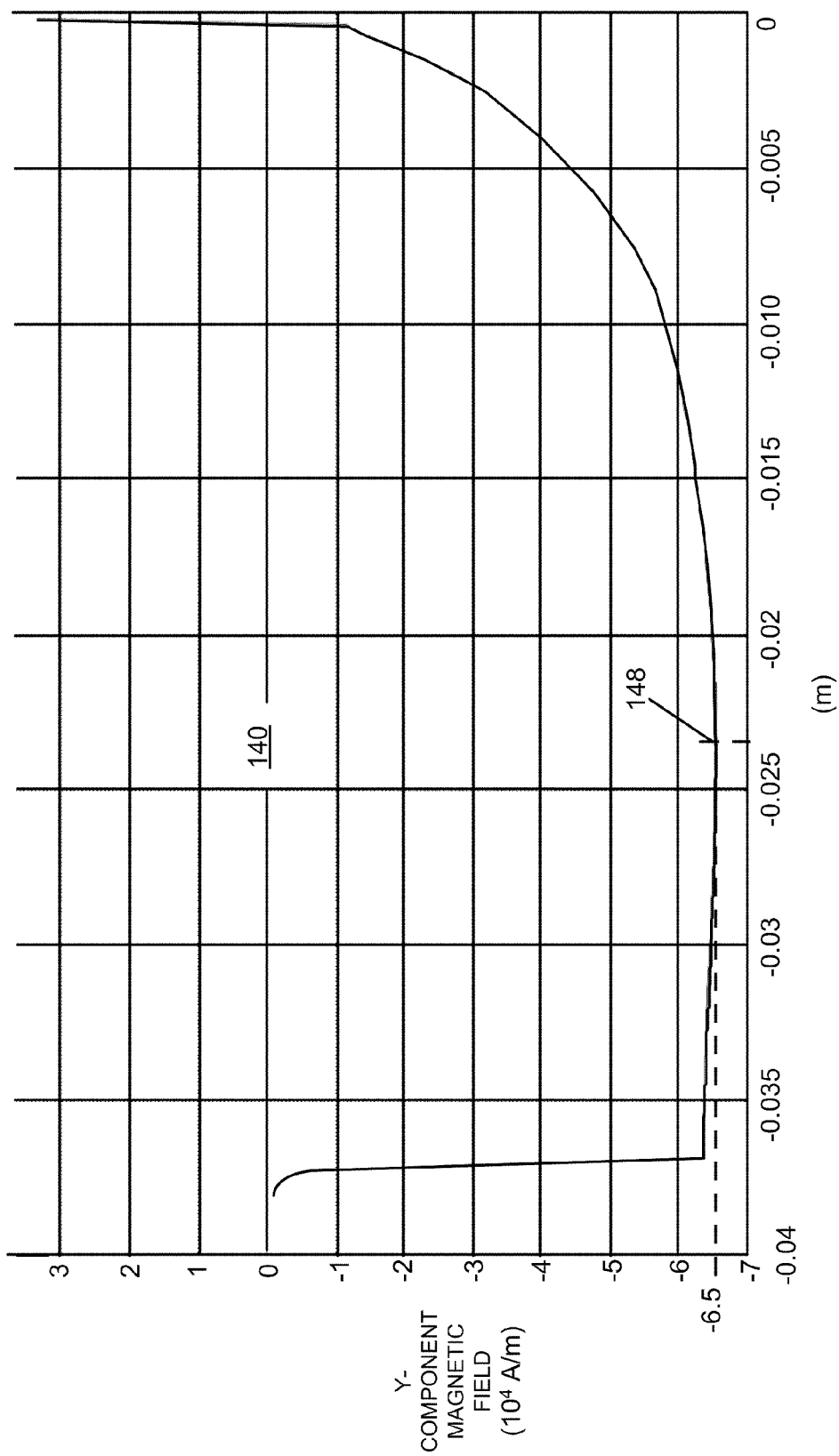
FIG. 8 is a plot of the magnetic field (perpendicular component) beneath a return pole beneath the return pole with the rear flare, as shown in FIG. 3.

FIG. 8 shows a graph 140 of magnetic field strength (perpendicular or y-component) beneath the return pole 32 for an embodiment of the recording head 10 with the rear flare 42. In this embodiment, the length of the return pole 36 terminates at the sloped trailing edge 48 of the rear flare 42 approximately 37 mm from the trailing write edge 62 of the recording pole 32. Similar to FIG. 7, the values on the x-axis represent distances from the trailing write edge of the recording pole 32, and the values on the y-axis represent the y-component of the magnetic field in A/m. A value of zero on the x-axis represents the location of the trailing write edge of the recording pole. Distances rearward of the trailing write edge have negative values.

The use of the rear flare 40 is beneficial in at least two respects: (1) the rear flare increases the surface area available for the returning magnetic flux, thus lowering the magnetic field; and (2) the increased reluctance of the tip of the rear flare smoothes the discontinuity at the trailing edge of the return pole and moves the peak value of the magnetic field towards the center of the return pole.

As shown in FIG. 8, because of the presence of the rear flare 40, the peak magnetic field beneath the return pole 36 is about half that of the embodiment without the rear flare, approximately 65 kA/m. This value is sufficiently below the coercivity of the magnetic recording medium (188 kA/m for this CoNiP formulation). Thus, the magnetic field is not great enough along the length of the return pole to erase any previously recorded regions over which the return pole sits when the recording pole magnetically records a new region. In addition, the peak magnetic field 148 occurs at a region near the middle of the recording pole, between its leading and trailing edges, rather than at its trailing edge.

Figure 9:
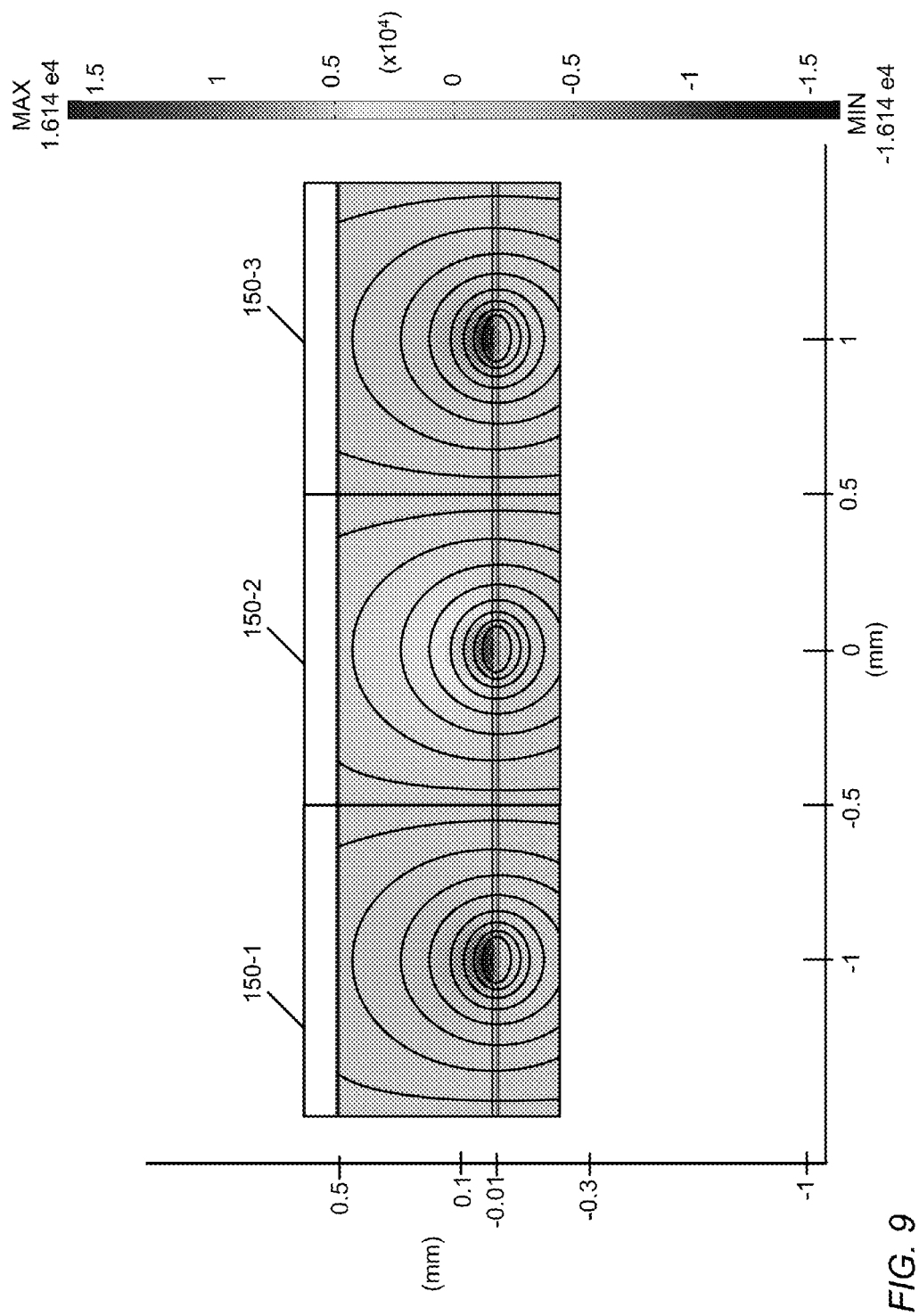
FIG. 9 is a simulation of the magnetic field and magnetic flux lines for three adjacent perpendicularly recorded regions.

FIG. 9 shows a graph simulating the magnetic field strength and magnetic flux lines for three adjacent magnetically recorded bits 150-1, 150-2, and 150-3 (generally, 150) that have been perpendicularly recorded with the magnetic recording head 10. The number of bits 150 is merely illustrative; the three recorded bits 150 can be part of a magnetically recorded track (extending laterally in FIG. 9) that has many more than the three bits shown.

The x-axis of the graph corresponds to distance in mm from the center of the middle recorded bit 150-2, which is deemed position 0. For illustration sake, distances left of the middle bit 150-2 are negative and those right of the middle bit 150-2 are positive. The centers of both recorded bits 150-1, 150-3 are approximately 1.0 mm distant from the middle recorded bit 150-2, and the contour of the magnetic flux lines of each recorded bit 150 spans approximately 1 mm (i.e., approximately 0.5 mm on each side of the center of that bit.

The y-axis on the left side of the graph corresponds to distance in mm from the surface of the recording medium. Distances above the surface are positive in value; those below the surface are negative. A vertical scale on the right side of the graph provides a measure of the magnetic field strength (i.e., the x-component in A/m) for each recorded bit. The magnitude of the magnetic field for each of the recorded bits 150 is approximately the same for each bit; whereas the polarity of magnetization for the middle recorded bit 150-2 is opposite that of its neighboring bits 150-1, 150-3. The contours illustrate the magnetic flux lines emanating from each recorded bit.

Figure 10:
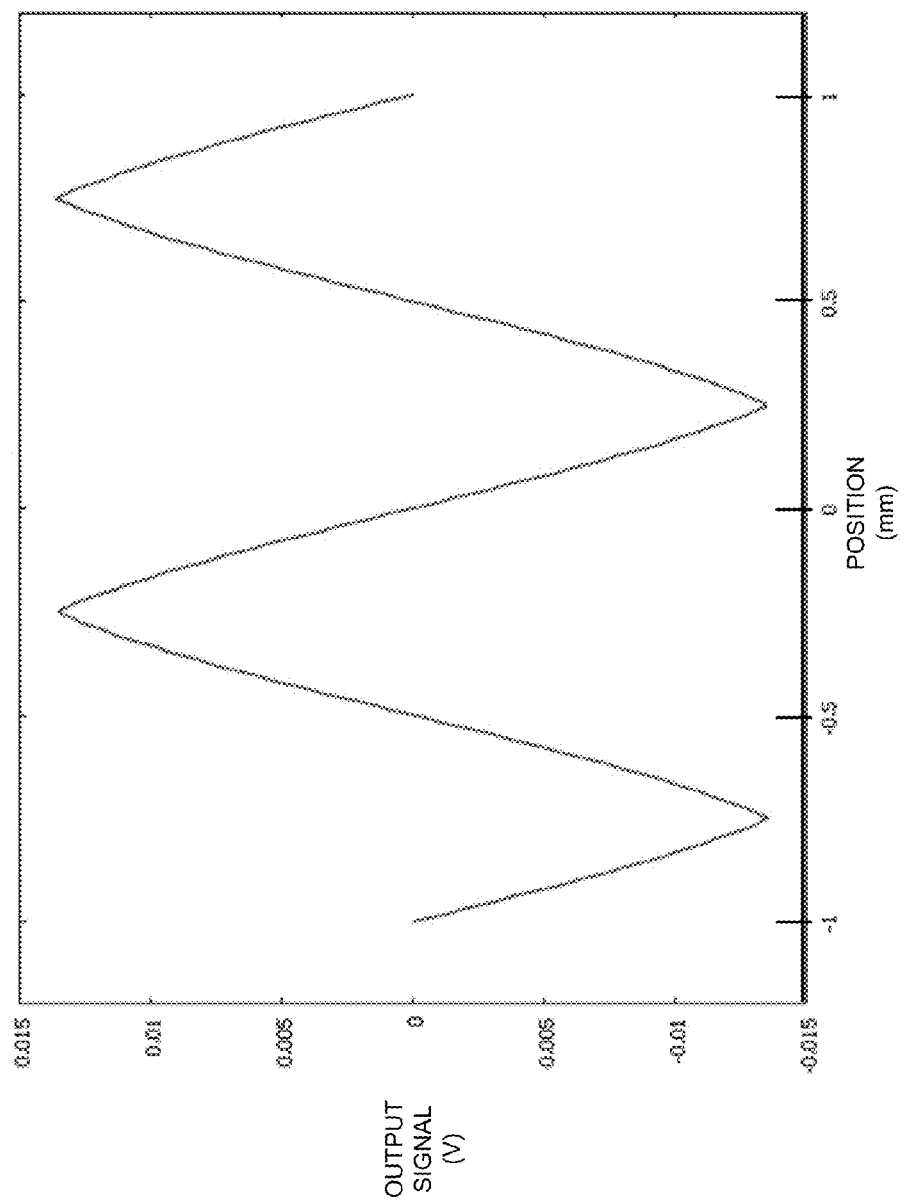
FIG. 10 is a simulation of the output voltage signal as detected by a giant magnetoresistive (GMR) differential sensor pair sensing the three adjacent perpendicularly recorded regions of FIG. 9.

FIG. 10 shows a simulation of the output voltage signal (y-axis) as detected by a GMR differential sensor pair sensing the three recorded bits of FIG. 9. GMR sensors are available in Micro Small Outline Packages (MSOP) that are approximately 3 mm by 3 mm by 1 mm in size. These read sensors can remotely sense the magnetized regions of the magnetically hard layer through non-magnetic layers, whether metallic, such as chrome, or non-metallic, such as plastic. One example of a GMR sensor that can be used is a NVE ABL015-00 read sensor produced by NVE Corporation of Eden Prairie, Minn.

The center of the middle recorded bit 150-2 is at position 0, that of the left recorded bit 150-1 is at position −1.0, and that of the right recorded bit 150-3 is at position +1.0. In one embodiment, the GMR sensor is oriented to measure the magnetic field parallel to the recording medium, which is a preferred orientation for reading perpendicularly recorded information. In addition, the GMR sensor is positioned approximately 490 µm distant from the recording medium (50 µm for the chrome plating, 325 µm for the GMR package, and 115 µm for a non-contact air gap between the GMR package and the surface of the chrome plating). The output voltage signal detected by the GMR sensor ranges from approximately −0.013 volts to approximately 0.013 volts.

While the invention has been shown and described with reference to specific preferred embodiments, it should be understood by those skilled in the art that various changes in form and detail may be made therein without departing from the spirit and scope of the invention as defined by the following claims.

What is claimed is:

1. A magnetic recording head for perpendicular magnetic recording of information into a recording medium, comprising:

means for energizing the magnetic recording head to produce a magnetic field;

a recording pole narrowing to a tip region having a leading write edge and a trailing write edge separated by first and second opposed side edges, the tip region providing a low reluctance path for magnetic flux generated by the energizing means; and a return pole spatially separated from and opposite the recording pole, the return pole having a base, a shield flare projecting forward from the base towards the trailing write edge of the tip region of the recording pole, and a rear flare projecting rearward from the base in an opposite direction of the projection of the shield flare, a leading edge of the shield flare being separated from the trailing write edge of the tip region by a gap, wherein the shield flare diverts magnetic flux generated by the energizing means from reaching the tip region of the recording pole, thereby shielding a recording medium beneath the shield flare from the magnetic field while the opposed side edges of the tip region of the recording pole and the recording medium beneath the gap are unshielded.

2. The magnetic recording head of claim 1, wherein the shield flare has an inclined plane shape that narrows to the leading edge near the trailing write edge of the tip region of the recording pole.

3. The magnetic recording head of claim 1, wherein the gap is less than one millimeter long.

4. The magnetic recording head of claim 1, wherein the leading edge of the shield flare has a width that is approximately equal to a width of the trailing write edge of the tip region of the recording pole.

5. The magnetic recording head of claim 1, wherein narrows to a tip region at a back end of the base.

6. The magnetic recording head of claim 5, wherein the rear flare has an inclined-plane shape.

7. The magnetic recording head of claim 1, wherein the leading and trailing edges of the tip region of the recording pole each has a width greater than 1 mm.

8. The magnetic recording head of claim 1, wherein the recording pole and return pole are part of a unitary piece of ferromagnetic material.

9. The magnetic recording head of claim 1, further comprising a midsection, and wherein the recording pole and the return pole are separately coupled to and separable from the midsection.

10. A system for magnetically recording information, comprising:
- a structural member having a magnetic recording medium at a surface thereof; and
- a magnetic recording head movably disposed on the surface of the structural member for magnetically recording information in the recording medium in a perpendicular magnetic orientation, the magnetic recording head comprising:
  - means for energizing the magnetic recording head to produce a magnetic field;
  - a recording pole narrowing to a tip region having a leading write edge and a trailing write edge separated by first and second opposed side edges, the tip region providing a low reluctance path for magnetic flux generated by the energizing means; and
  - a return pole spatially separated from and opposite the recording pole, the return pole having a base, a shield flare projecting forward from the base towards the trailing write edge of the tip region of the recording pole, and a rear flare projecting rearward from the base in an opposite direction of the projection of the shield flare, a leading edge of the shield flare being separated from the trailing write edge of the tip region by a gap,
  - wherein the shield flare diverts magnetic flux generated by the energizing means from reaching the tip region of the recording pole, thereby shielding a recording medium beneath the shield flare from the magnetic field while the opposed side edges of the tip region of the recording pole and the recording medium beneath the gap are unshielded.

11. The system of claim 10, wherein the shield flare has an inclined-plane shape that narrows to the leading edge near the trailing write edge of the tip region of the recording pole.

12. The system of claim 10, wherein the gap is less than one millimeter long.

13. The system of claim 10, wherein the leading edge of the shield flare has a width that is approximately equal to a width of the trailing write edge of the tip region of the recording pole.

14. The system of claim 10, wherein the rear flare narrows to a tip region at a back end of the base.

15. The system of claim 14, wherein the rear flare has an inclined-plane shape.

16. The system of claim 10, wherein the leading and trailing edges of the tip region of the recording pole each has a width greater than 1 mm.

17. The system of claim 10, wherein the recording pole and return pole are part of a unitary piece of ferromagnetic material.

18. The system of claim 10, wherein the magnetic recording head further comprises a midsection, and the recording pole and return pole are separately coupled to and separable from the midsection.

19. The system of claim 10, wherein the structural member is a piston rod attached to a piston.

* * * * *